US012246757B2

(12) United States Patent
Austrheim

(10) Patent No.: US 12,246,757 B2
(45) Date of Patent: Mar. 11, 2025

(54) SAFETY DEVICE FOR A REMOTELY OPERATED VEHICLE, A SYSTEM AND A METHOD OF IMPROVING THE OPERATIONAL SAFETY OF A GRID SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 966 days.

(21) Appl. No.: 17/059,222

(22) PCT Filed: Jun. 11, 2019

(86) PCT No.: PCT/EP2019/065210
§ 371 (c)(1),
(2) Date: Nov. 26, 2020

(87) PCT Pub. No.: WO2019/238676
PCT Pub. Date: Dec. 19, 2019

(65) Prior Publication Data
US 2021/0086782 A1   Mar. 25, 2021

(30) Foreign Application Priority Data

Jun. 12, 2018  (NO) .................................... 20180813
Jul. 19, 2018  (NO) .................................... 20181005
Nov. 28, 2018  (NO) .................................... 20181524

(51) Int. Cl.
*B61B 13/00*   (2006.01)
*B65G 1/04*   (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
None
See application file for complete search history.

(56) References Cited

U.S. PATENT DOCUMENTS 3,519,150 A * 7/1970 Keenan ................ B65G 1/0428
414/284
3,800,963 A   4/1974 Holland
(Continued)

FOREIGN PATENT DOCUMENTS

CA  2988122 A1   12/2016
CN  2683473 Y *  3/2005
(Continued)

OTHER PUBLICATIONS

Office Action issued in the counterpart European Patent Application No. 19730155.9, mailed on Sep. 4, 2023 (6 pages).
(Continued)

*Primary Examiner* — Redhwan K Mawari
*Assistant Examiner* — Kai Nmn Wang
(74) *Attorney, Agent, or Firm* — Baker Botts L.L.P.

(57) ABSTRACT

A remotely operated delivery vehicle for transport of a storage container between an automated storage and retrieval grid, which is configured to store a plurality of stacks of storage containers, and an access station for handling of the storage container by at least one of a robotic operator and human operator. The remotely operated delivery vehicle comprising; —a vehicle body comprising a motor for driving a plurality of rolling devices for moving the remotely operated delivery vehicle in a horizontal plane; —a control unit for controlling the remotely operated deliv-
(Continued)

ery vehicle; and —a container carrier (35) provided above the motorized vehicle body for carrying a storage container. The remotely operated delivery vehicle comprises a safety device which transmits a signal to the control unit such that it performs an action of operating the remotely operated delivery vehicle, in the event that a collision is detected. The collision is caused by a force (F) acting on the remotely operated delivery vehicle (30) and is detected by a collision mechanism (60) of the safety device and the collision mechanism is a container carrier displacement device (60) arranged such that it trips the safety device upon displacement of the container carrier (35) relative to the motorized vehicle body (31), which first position is the undisplaced position and the second position is the displaced position.

10 Claims, 11 Drawing Sheets

(51) Int. Cl.
| | |
|---|---|
| B65G 1/06 | (2006.01) |
| B65G 1/137 | (2006.01) |
| B65G 47/06 | (2006.01) |
| B65G 47/52 | (2006.01) |
| B65G 57/03 | (2006.01) |
| B65G 63/06 | (2006.01) |
| B65G 65/23 | (2006.01) |
| B65G 67/24 | (2006.01) |
| B66F 9/06 | (2006.01) |
| B66F 9/19 | (2006.01) |
| G05D 1/00 | (2006.01) |
| B60W 50/00 | (2006.01) |
| B65G 43/00 | (2006.01) |
| B65G 63/00 | (2006.01) |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01)

(56) References Cited

U.S. PATENT DOCUMENTS

| | | | |
|---|---|---|---|
| 4,161,228 A | | 7/1979 | Svensson et al. |
| 4,538,950 A | * | 9/1985 | Shiomi ................ B23Q 7/1426 |
| | | | 414/351 |
| 4,909,697 A | | 3/1990 | Bernard, II et al. |
| 5,538,809 A | * | 7/1996 | Bittihn .................... B60L 53/16 |
| | | | 320/109 |
| 7,101,139 B1 | | 9/2006 | Benedict |
| 8,628,289 B1 | * | 1/2014 | Benedict ............ B65G 1/0478 |
| | | | 414/217 |
| 9,358,975 B1 | * | 6/2016 | Watts ................... G05D 1/0223 |
| 9,527,669 B1 | | 12/2016 | Hanssen et al. |
| 2003/0093176 A1 | | 5/2003 | Ohtsuka et al. |
| 2005/0047895 A1 | | 3/2005 | Lert |
| 2005/0232729 A1 | | 10/2005 | Dehne |
| 2011/0027059 A1 | | 2/2011 | Benedict et al. |
| 2012/0267404 A1 | * | 10/2012 | Rottinghaus ............ B60R 9/065 |
| | | | 224/547 |
| 2012/0282068 A1 | | 11/2012 | Tschurwald et al. |
| 2014/0014470 A1 | | 1/2014 | Razumov |
| 2014/0086714 A1 | * | 3/2014 | Malik .................. B65G 1/0492 |
| | | | 414/273 |
| 2014/0277693 A1 | * | 9/2014 | Naylor ................... B65G 1/065 |
| | | | 700/218 |
| 2014/0288696 A1 | | 9/2014 | Lert |
| 2014/0292274 A1 | | 10/2014 | Dorval et al. |
| 2014/0311858 A1 | | 10/2014 | Keating et al. |
| 2015/0127143 A1 | * | 5/2015 | Lindbo .................. G05B 15/02 |
| | | | 700/218 |
| 2016/0060037 A1 | | 3/2016 | Razumov |
| 2016/0145058 A1 | * | 5/2016 | Lindbo ................ B65G 1/0457 |
| | | | 700/218 |
| 2016/0176638 A1 | | 6/2016 | Toebes |
| 2016/0229630 A1 | | 8/2016 | Gebhardt et al. |
| 2016/0325932 A1 | * | 11/2016 | Hognaland ............. B60L 15/40 |
| 2017/0050809 A1 | * | 2/2017 | Itoh .......................... B66F 3/02 |
| 2017/0057745 A1 | | 3/2017 | Ueda et al. |
| 2017/0166400 A1 | | 6/2017 | Hofmann |
| 2017/0183154 A1 | | 6/2017 | Kinugawa et al. |
| 2018/0044110 A1 | * | 2/2018 | Clarke ................. B65G 1/0464 |
| 2018/0068253 A1 | | 3/2018 | Simms et al. |
| 2018/0082162 A1 | | 3/2018 | Durham et al. |
| 2018/0118078 A1 | | 5/2018 | Alkhaldi et al. |
| 2018/0141754 A1 | | 5/2018 | Garrett |
| 2018/0150793 A1 | | 5/2018 | Lert, Jr. et al. |
| 2020/0148474 A1 | | 5/2020 | Salichs et al. |

FOREIGN PATENT DOCUMENTS

| | | | | | |
|---|---|---|---|---|---|
| CN | 101553416 A | | 10/2009 | | |
| CN | 101711210 A | | 5/2010 | | |
| CN | 102050333 A | | 5/2011 | | |
| CN | 102992012 A | | 3/2013 | | |
| CN | 104066661 A | | 9/2014 | | |
| CN | 104781163 A | | 7/2015 | | |
| CN | 104885106 A | | 9/2015 | | |
| CN | 105383848 A | | 3/2016 | | |
| CN | 105517923 A | | 4/2016 | | |
| CN | 105899398 A | | 8/2016 | | |
| CN | 105947514 A | | 9/2016 | | |
| CN | 106064718 A | | 11/2016 | | |
| CN | 106241154 A | | 12/2016 | | |
| CN | 106414278 A | | 2/2017 | | |
| CN | 106575391 A | | 4/2017 | | |
| CN | 106625618 A | * | 5/2017 | | |
| CN | 106660703 A | | 5/2017 | | |
| CN | 106662874 A | | 5/2017 | | |
| CN | 106829298 | | 6/2017 | | |
| CN | 106829298 A | | 6/2017 | | |
| CN | 206790852 U | | 12/2017 | | |
| CN | 108140168 A | | 6/2018 | | |
| CN | 109395410 A | * | 3/2019 | ............ | A63H 17/00 |
| CN | 210277061 U | * | 4/2020 | ............ | A47L 11/24 |
| DE | 4016810 C1 | | 11/1991 | | |
| DE | 9310690 U1 | | 9/1993 | | |
| DE | 102009017241 A | | 10/2010 | | |
| EP | 0420061 | | 4/1991 | | |
| EP | 0458021 | | 11/1991 | | |
| EP | 0458021 A1 | | 11/1991 | | |
| EP | 1103816 | | 5/2001 | | |
| EP | 2357489 | | 8/2011 | | |
| EP | 2881905 A1 | | 6/2015 | | |
| EP | 3003932 A1 | | 4/2016 | | |
| EP | 3288865 A1 | | 3/2018 | | |
| FR | 2377638 | | 8/1978 | | |

(56) References Cited

FOREIGN PATENT DOCUMENTS

| | | | |
|---|---|---|---|
| GB | 1 267 751 A | 3/1972 |
| GB | 1276160 A | 6/1972 |
| GB | 2211822 | 7/1989 |
| GB | 2 233 319 A | 1/1991 |
| JP | S60-137703 A | 7/1985 |
| JP | S60191855 | 9/1985 |
| JP | S-60191855 A * | 9/1985 |
| JP | S64-017707 A | 1/1989 |
| JP | H06-043936 A | 2/1994 |
| JP | H08-217209 A | 8/1996 |
| JP | H09-152914 A | 6/1997 |
| JP | H11-143538 A | 5/1999 |
| JP | 2000-191106 A | 7/2000 |
| JP | 2001344020 | 12/2001 |
| JP | 2003-137406 A | 5/2003 |
| JP | 2005352855 | 12/2005 |
| JP | 2009-184775 A | 8/2009 |
| JP | 2011-102166 A | 5/2011 |
| JP | 2015-535517 A | 12/2015 |
| JP | 2017-088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2012/106746 A1 | 8/2012 |
| WO | 2012/106747 A1 | 8/2012 |
| WO | 2014075937 A1 | 5/2014 |
| WO | WO2014/075937 | 5/2014 |
| WO | 2014090684 A1 | 6/2014 |
| WO | 2015193278 A1 | 6/2014 |
| WO | WO2014/090684 | 6/2014 |
| WO | 2014/195901 A1 | 12/2014 |
| WO | WO2014/195901 | 12/2014 |
| WO | 2015/084236 A1 | 6/2015 |
| WO | 2015/140216 A1 | 9/2015 |
| WO | 2015/170660 A1 | 11/2015 |
| WO | WO2015/185628 | 12/2015 |
| WO | WO 2015/193278 | 12/2015 |
| WO | 2016/166323 A1 | 10/2016 |
| WO | WO2016/166294 A | 10/2016 |
| WO | 2016/172793 A1 | 11/2016 |
| WO | 2016/196815 A1 | 12/2016 |
| WO | 2016/198467 A1 | 12/2016 |
| WO | WO2016/196815 | 12/2016 |
| WO | 2017/081281 A1 | 5/2017 |
| WO | 2017081273 A1 | 5/2017 |
| WO | WO2017/081281 | 5/2017 |
| WO | 2017/121512 A1 | 7/2017 |
| WO | 2017/121515 A1 | 7/2017 |
| WO | 2017/153563 A1 | 9/2017 |
| WO | WO2017/211640 A | 12/2017 |
| WO | WO2017/220651 | 12/2017 |
| WO | 2018/162757 A1 | 9/2018 |

OTHER PUBLICATIONS

Office Action in counterpart Japanese Patent Application No. 2020-568698 issued on May 29, 2023 (9 pages).
Office Action in counterpart Japanese Patent Application No. 2020-569140 issued on Jun. 2, 2023 (5 pages).
Office Action in counterpart Japanese Patent Application No. 2020-568805 issued on Jun. 5, 2023 (7 pages).
Office Action in counterpart Japanese Patent Application No. 2020-569128 issued on Jul. 3, 2023 (6 pages).
Office Action in counterpart Japanese Patent Application No. 2020-568714 issued on Jul. 3, 2023 (16 pages).
Office Action issued in Chinese Application No. 201980039066.2 mailed on Sep. 10, 2021 (6 pages).
Search Report issued in Chinese Application No. 201980039066.2 mailed on Sep. 6, 2021 (2 pages).
NOSR of Feb. 6, 2019.
ISR of Sep. 12, 2019.
ISR of Jun. 12, 2019.
NOSR of Apr. 15, 2019.
ISR of Sep. 25, 2019.
United States Office Action in related U.S. Appl. No. 16/972,482, mailed Mar. 22, 2022 (46 pages).
Office Action issued in Chinese Application No. 201980037723X; Dated Sep. 27, 2021 (25 pages).
Search Report issued in Chinese Application No. 2019800383353; Dated Dec. 24, 2021 (3 pages).
Office Action issued in Chinese Application No. 201980037162.3; Dated Sep. 27, 2021 (8 pages).
Extended European Search Report issued in European Application No. 21186410.3, dated Nov. 25, 2021 (5 pages).
Office Action in counterpart Chinese Patent Application No. 201980038856.9 issued on Oct. 19, 2021 (16 pages).
Office Action in counterpart Chinese Patent Application No. 2019800538763 issued on Dec. 6, 2021 (13 pages).
Office Action in counterpart Chinese Patent Application No. 2019800393798 issued on Dec. 9, 2021 (17 pages).
Office Action in counterpart Chinese Patent Application No. 201980038106.1 issued on Sep. 8, 2021 (6 pages).
Office Action in counterpart Chinese Patent Application No. 201980039028.7 issued on Oct. 27, 2021 (15 pages).
Office Action in counterpart Chinese Patent Application No. 201980039046.5 issued on Sep. 15, 2021 (18 pages).
Office Action in counterpart Chinese Patent Application No. 201980039068.1 issued on Sep. 15, 2021 (23 pages).
Office Action issued in counterpart Japanese Patent Application No. 2020-568712 mailed on Jun. 26, 2023 (7 pages).

* cited by examiner

SAFETY DEVICE FOR A REMOTELY OPERATED VEHICLE, A SYSTEM AND A METHOD OF IMPROVING THE OPERATIONAL SAFETY OF A GRID SYSTEM

The present invention relates to a safety device for a delivery vehicle adapted for transport of storage containers between a storage grid for storage of storage containers, and a second predetermined location adapted for handling of the storage container.

More specific, the invention is directed to a remotely operated delivery vehicle comprising a safety device which transmits a signal to a control unit such that it performs an action of operating the remotely operated vehicle, in the event that a collision is detected.

BACKGROUND AND PRIOR ART

FIGS. 1A and 2A disclose a typical prior art automated storage and retrieval system 1 with a framework structure 100. FIGS. 2A and 2B disclose a prior art container handling vehicle 101 operating the system 1 disclosed in FIGS. 1A and 2A, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extension of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the embodiment disclosed in FIGS. 1A and 2A, $Z=8$ identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell $X=10$, $Y=2$, $Z=3$. The container handling vehicles 101 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the grid 104. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral or horizontal extent of a grid cell 122, i.e. corresponding to the area of a grid cell 122 in the X and Y directions, e.g. as is described in WO2015/193278A1, the contents of which are incorporated herein by reference.

Alternatively, the container handling vehicles 200 may have a footprint which is larger than the lateral extent of a grid column 112, e.g. as is disclosed in WO2014/090684A1.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a delivery column 119,120. The drop-off and pick-up ports of the container handling vehicles is referred to the upper ports of a delivery column 119,120.

The storage grids 104 in FIGS. 1A and 2A comprise two delivery columns 119 and 120. The first delivery column 119 may for example comprise a dedicated drop-of port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

The access or transfer station may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. As an alternative to ports as part of the storage grids 104, it may be envisaged ports that transfer storage containers out of or into the storage grid 104, e.g. for transferring storage containers 106 to another storage facility (e.g. to another storage grid), directly to a transport vehicle (e.g. a train or a lorry), or to a production facility.

A delivery vehicle may be arranged to operate on a dedicated delivery rail system such that a storage container may be transported between the storage grid and the picking or stocking station. Such delivery vehicles are heavy in weight and operate at high speed on the same level as the human operators and may therefore pose a potential hazard to the human operator. The human operator may, for example, get a hand, foot or other body parts squeezed between the delivery vehicles or between vehicles and fixed structures (such as rails, walls, cabinet, etc.). Hence, there is a need for a safety device which can reduce the hazard to a human operator in case of a collision with a delivery vehicle.

The objective is to provide a safe and reliable automated storage and retrieval system in operation, such that it prevents or at least reduces the potential for injury to human operators in case of a collision.

SUMMARY OF THE INVENTION

The invention is set forth in the independent claims and the dependent claims describe alternatives of the invention.

In the following the term "remotely operated delivery vehicle" is referred to as the "delivery vehicle" and the term "automated storage and retrieval grid" is referred to as the "storage grid". The term "a storage container" is also known in prior art as "a bin". The term "picking and stocking station" is also referred to as an "access station" or "accessing station".

The present invention is related to a remotely operated delivery vehicle for transport of a storage container between an automated storage and retrieval grid, which is configured to store a plurality of stacks of storage containers, and an access station for handling of the storage container by at least one of a robotic operator and human operator.

The remotely operated delivery vehicle comprising;

a vehicle body comprising a motor for driving a plurality of rolling devices for moving the remotely operated delivery vehicle in a horizontal plane (P1);

a control unit for controlling the remotely operated delivery vehicle; and a container carrier provided above the motorized vehicle body for carrying a storage container.

The remotely operated delivery vehicle further comprises a safety device which transmits a signal to the control unit such that it performs an action of operating the remotely operated delivery vehicle, in the event that a collision is detected.

The action of operating the remotely operated vehicle may be by operating the motor for driving the plurality of rolling devices.

The action of operating the remotely operated delivery vehicle is at least any one of; shutting off the motor for driving the plurality of rolling devices, reversing the moving direction of the rolling devices or reducing the speed of the rolling devices.

The safety device may be connected to the control unit by wire or wireless.

In the event of a collision, the safety device will transmit a signal to the drive unit situated onboard in the delivery vehicle. Upon receiving the signal, the control unit performs a necessary action for controlling the vehicle. The action may be shutting down the motor, such that the delivery vehicle loses its propulsion power, thereby causing the vehicle to stop. The control unit may also instruct the motor to reverse the moving direction of the rolling devices. For example, the control unit may activate a reversing switch or sensor to switch the polarity of a drive signal being sent to the drive motors. The control unit may also perform the action of reducing the speed of the rolling devices by applying a break force to the rolling devices. For example, the break force may be performed by actively braking with the magnetic field of the motors.

The control unit for operating the motor or motors of the motor-driven rolling devices may be located locally on the delivery vehicle. The safety device transmits the signal to the control unit, which performs the action of operating the delivery vehicle such that the power is shut down or turning the magnetic field of the motor or breaking with the magnetic field of the motor.

In embodiments, the system may comprise an external control unit situated external to the delivery vehicle, and a local control unit of the delivery vehicle. In the event of a collision, the safety device transmits a signal to the external control unit via the local control unit, and wherein the external control unit may operate the delivery vehicle via the internal control unit.

The remotely operated delivery vehicle comprises a vehicle body which may comprise at least one compartment for storing a power source such as a battery. The at least one compartment may also be adapted to store components such as wheel shift motor, tilt motor, actuators or controllers. The rolling device, such as wheels or driving belts, may be connected to the vehicle body of the delivery vehicle and may be operated by an electric motor. The electric motor may for example be arranged at least partly within the rolling device. The electric motor may be a hub motor, for example, located within a hub of a wheel or directly connected with the hub or providing the hub of the driven wheel.

The drive motor or motors are arranged to drive the rolling devices (i.e. wheels) of the delivery vehicle such that the delivery vehicle may operate on rails on a delivery rail system. The delivery rail system may comprise at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), which first and second set of rails form a grid pattern in the horizontal plane (P1) comprising a plurality of adjacent grid cells of the delivery rail system.

A collision is caused by a force (F) acting on the remotely operated delivery vehicle and may be detected by a collision mechanism in the form of a displacement mechanism. For example, if a human operator gets a hand squeezed between a delivery vehicle and a cabinet of the container accessing station, the collision mechanism detect that a collision has occurred through displacement of one part of the mechanism with respect to another part and activating the safety device to transmit a signal to the control unit such that an action of operating the delivery vehicle is performed. The action may for example be instructing the rolling devices to move in a reverse (opposite) direction of the moving direction compared to prior to the collision. The delivery vehicle will immediately stop or reverse, due to the reverse torque or break applied to the wheels, in response to the collision such that potential injury to the human operator may be avoided or reduced.

The safety device may comprise a collision mechanism and a sensor, a switch or a combination thereof. The sensor or switch may be activated when a dangerous situation occurs such as in the event of a collision. The sensor or switch operates as a fail-safe device providing a signal to the control unit which automatically stops or reverses the delivery vehicle, by applying a reverse torque to the wheels, for bringing the vehicle to a safe state, when activated. Such safe state may be for example reversing the vehicle at least a distance, or reduce the power to idle, or applying brakes while leaving the vehicle still active and ready to resume normal operation once control is reestablished.

The sensor/switch may be at least any one of a device for making of breaking a connection in a circuit or providing a signal when being tripped.

The sensor may be at least any one of a light sensor, movement sensor or pressure sensor, etc.

In embodiments, in the safe state of the delivery vehicle, the control unit may be connected to a mechanical device for activating a mechanical clutch, so that the motor is still active but the clutch is not connected so that torque is not transmitted to the rolling devices, or the device may be connected to a ratchet or brake to stop the rotation of a drive shaft or rotating part.

The delivery vehicle may resume normal operation by manually re-starting the vehicle or re-setting the collision mechanism. The delivery vehicle may also be re-activated by the control unit.

To avoid injury or at least reduce harm to human operators and/or reduce the damage on equipment, it is desirable that the delivery vehicle stops and/or is reversed in the event that a collision is detected.

In order to avoid self-activation of the collision mechanism, the collision mechanism may be provided with a preset resistance or force that must be overcome such that it is activated only when a force transmitted to the delivery vehicle exceeds a predefined value. Such a preset force or resistance may rely on friction, spring or some other form of pre-load that must be overcome by the force of the collision.

In embodiments, the collision mechanism may be in the form of a pressure sensor. The pressure sensor may be located on the vehicle body of the delivery vehicle, or the pressure sensor may be located on the container carrier, or it may be located between the vehicle body and the container carrier. Preferably, the pressure sensor may be arranged and located at a periphery area of the delivery vehicle. Such an area may for instance be the most likely impact area in case of collision.

The pressure sensor may be a compressible device arranged such that said device is uncompressed in normal operation of the delivery vehicle, and while upon collision, a force acting on said device will make the device compress, thereby activating the safety device. The compressible device may be at least any one of; a button, a switch or a bumper.

In embodiments, the collision mechanism may be in form of an elongate compressible list such as a clamping strip. The clamping strip comprising two layers of rubber, one with electrically conductive rubber and one with normal insulating rubber. A copper wire molded into two separated layers of electrically conductive rubber forms, together with a resistance at the end of the clamping strip, a closed circuit. In the event of a collision, the two separated layers of conductive rubber are pressed together, causing the device to short-circuit. Thus, the collision is detected through the triggering of the collision mechanism, causing transmission of the reversing signal to the control unit of the delivery vehicle.

The clamping strips may be arranged at the periphery on top of the container carrier, or at a location on the delivery vehicle where a collision is most likely to happen.

In embodiments, the collision mechanism may comprise a sliding device connected to the container carrier which trips as a result of a part being displaced with respect to another in the event of a collision.

The sliding device may be arranged as a L-shaped arm arranged on sliding rails or tracks, and connected to the underside of the container carrier, such that when a collision occurs, the sliding L-shaped arm detects the collision by pressing or activating a sensor, a switch or a combination thereof, at the underside of the container carrier, thereby tripping the safety device.

The sensor, switch or a combination thereof, may also be located at a side of the container carrier.

Thus, the sliding device may be connected to the delivery vehicle such that the collision mechanism is tripped in the event that said sliding device or part of the sliding device is moved or slides from one position to another.

In further embodiments, the collision mechanism may be a container carrier displacement device arranged such that a collision is detected upon displacement of the container carrier relative to the motorized vehicle body, which first position of the container carrier displacement device is the un-displaced position and the second position is the displaced position. The collision mechanism may comprise a sensor, a switch, or a combination thereof, and adapted to be tripped through movement of the collision mechanism.

The container carrier displacement device may comprise a first sliding part moveable in a first direction (X), and a second sliding part moveable in a second direction (Y) which is orthogonal to the first direction.

The second sliding part may be arranged on a second track provided on the motorized vehicle body for movement in the second direction (Y), and the first plate may be arranged on a first track provided on the second sliding part, for movement in the first direction (X).

The above arrangement allows the container carrier to be displaced forward and backwards in both X and Y direction.

The first sliding part is connected to a first sensor/switch of the collision mechanism for tripping the safety device of the delivery vehicle in the first direction (X). The second sliding part is connected to a second sensor/switch of the collision mechanism for tripping the safety device of the delivery vehicle in the second direction (Y). The delivery vehicle may comprise two (or more) collision mechanisms, one for detecting a collision in one direction and another (or more) collision mechanism for detecting a collision in another direction.

The sensor/switch is arranged such that when triggered or moved, the sensor/switch trips the safety device such that a signal is sent to the control unit such that the rolling devices are instructed to stop or reverse. The sensor/switch may be arranged in a recess of the container carrier displacement device such that when the container carrier displacement device is moved in a direction forward or backward (relative to the centered reference position), the sensor/switch moves simultaneously and trips the safety device.

In operation, the rolling devices of delivery vehicle may move in a first moving direction. The container carrier displacement device may be in a centered reference position. In the event of collision, the container carrier may be displaced relative to the centered reference position such that a sensor/switch connected to the container carrier displacement device is moved (activated). The sensor/switch trips the safety device to transmit a signal to the control unit to instruct the rolling devices to reverse or stop the movement in the first moving direction.

The container carrier displacement device (and the container carrier) may be centered in the reference position by means of spring. It may be preferable to provide a pre-load in the centered reference position in order to avoid uncontrolled movement of the container carrier displacement device. The pre-load may be arranged such that the container carrier displacement device is activated only if the force acting on the container carrier exceeds a predetermined value. Such arrangement may be at least any one of a; friction device, spring or magnetic device.

The invention is further directed to an automated storage and retrieval system comprising an automated storage and retrieval grid and a delivery system.

The automated storage and retrieval system comprising an automated storage and retrieval grid for storage of storage containers, and a delivery system for transport of said storage containers between the automated storage and retrieval grid and a container accessing station of the delivery system.

The automated storage and retrieval grid comprises a container handling vehicle rail system for guiding a plurality of container handling vehicles, the container handling vehicle rail system comprising at least a first set of parallel rails arranged in a horizontal plane (P) and extending in a first direction (X), and at least a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells.

The delivery system comprises a delivery rail system for guiding a plurality of remotely operated delivery vehicles, the delivery rail system being arranged on a level below the container handling vehicle rail system and extends to the container accessing station. The remotely operated delivery vehicle of the delivery system comprises:
  a vehicle body comprising a motor for driving a plurality of rolling devices for moving the remotely operated delivery vehicle in a horizontal plane (P1);
  a control unit for controlling the remotely operated delivery vehicle; and
  a container carrier provided above the motorized vehicle body for carrying a container,
wherein the remotely operated delivery vehicle comprises a safety device which transmits a signal to the control unit such that it performs an action of operating the remotely operated delivery vehicle, in the event that a collision is detected.

The action of operating the remotely operated delivery vehicle is at least any one of; shutting down the motor, reversing the moving direction of the rolling devices or reducing the speed of the rolling devices.

The collision may cause a force (F) to act on the remotely operated delivery vehicle which is detected by a collision mechanism of the safety device.

The delivery system may further comprise at delivery rail system, the delivery rail system (50) comprises at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), which first and second sets of rails form a grid pattern in the horizontal plane (P1) comprising a plurality of adjacent delivery vehicle grid cells.

The delivery rail system is located at an area where human's operators are operating by picking and/or inserting items into storage containers at the container accessing station. Therefore, in order to improve the operational safety of the delivery grid system, the delivery vehicles are provided with the safety device which is tripped in the event that a collision is detected.

The invention is also related to a method of improving operational safety of a delivery grid system, wherein the delivery grid system comprises a remotely operated delivery vehicle comprising;
  a vehicle body comprising a motor for driving a plurality of rolling devices for moving the remotely operated delivery vehicle in a horizontal plane (P1);
  a control unit for controlling the remotely operated delivery vehicle;
  a container carrier provided above the motorized vehicle body for carrying a container, and
  a safety device which activates in the event that a collision is detected.
wherein the method comprises the steps of;
  a) operating the remotely operated delivery vehicle on the delivery grid system,
  b) detecting a collision by means of a collision mechanism,
  c) activating a safety device to transmit a signal to the control unit,
  d) performing an action of operating the remotely operated delivery vehicle, said action being at least any one of; shutting down the motor, reversing the moving direction of the rolling devices or reducing the speed of the rolling devices.

BRIEF DESCRIPTION OF THE DRAWINGS

The following drawings depict exemplary embodiments of the present invention and are appended to facilitate the understanding of the invention.

DETAILED DESCRIPTION OF THE INVENTION

Figure 1A:
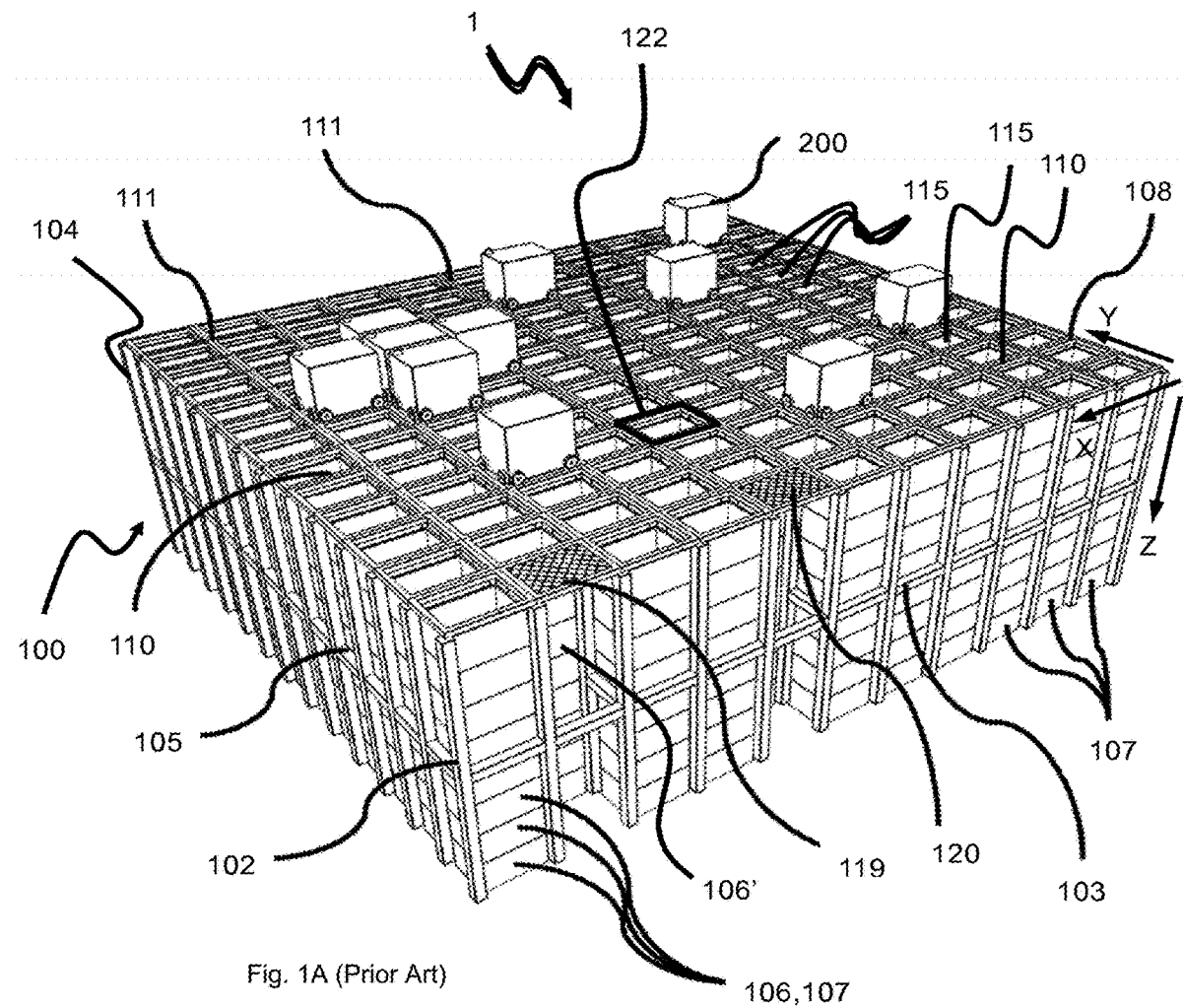
FIG. 1 A-D are perspectives view of a prior art automated storage and retrieval system, where FIG. 1A
FIG. 1C shows the complete system and FIG. 1B
FIG. 1D shows examples of system operable prior art container handling vehicles.
Figure 1B:
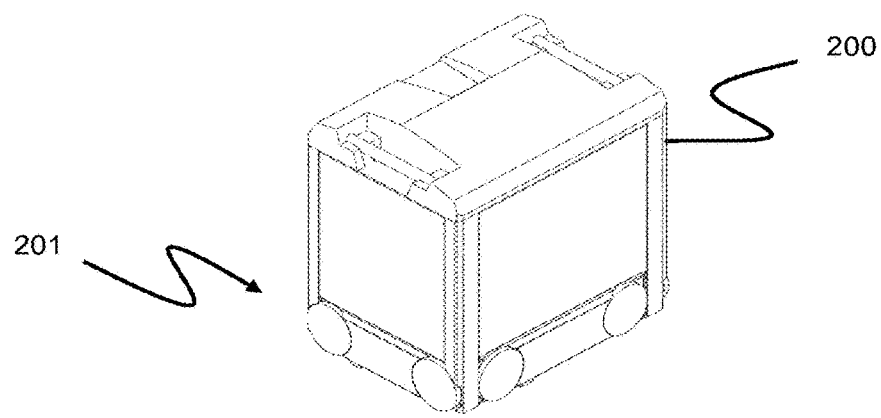

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

Figure 1C:
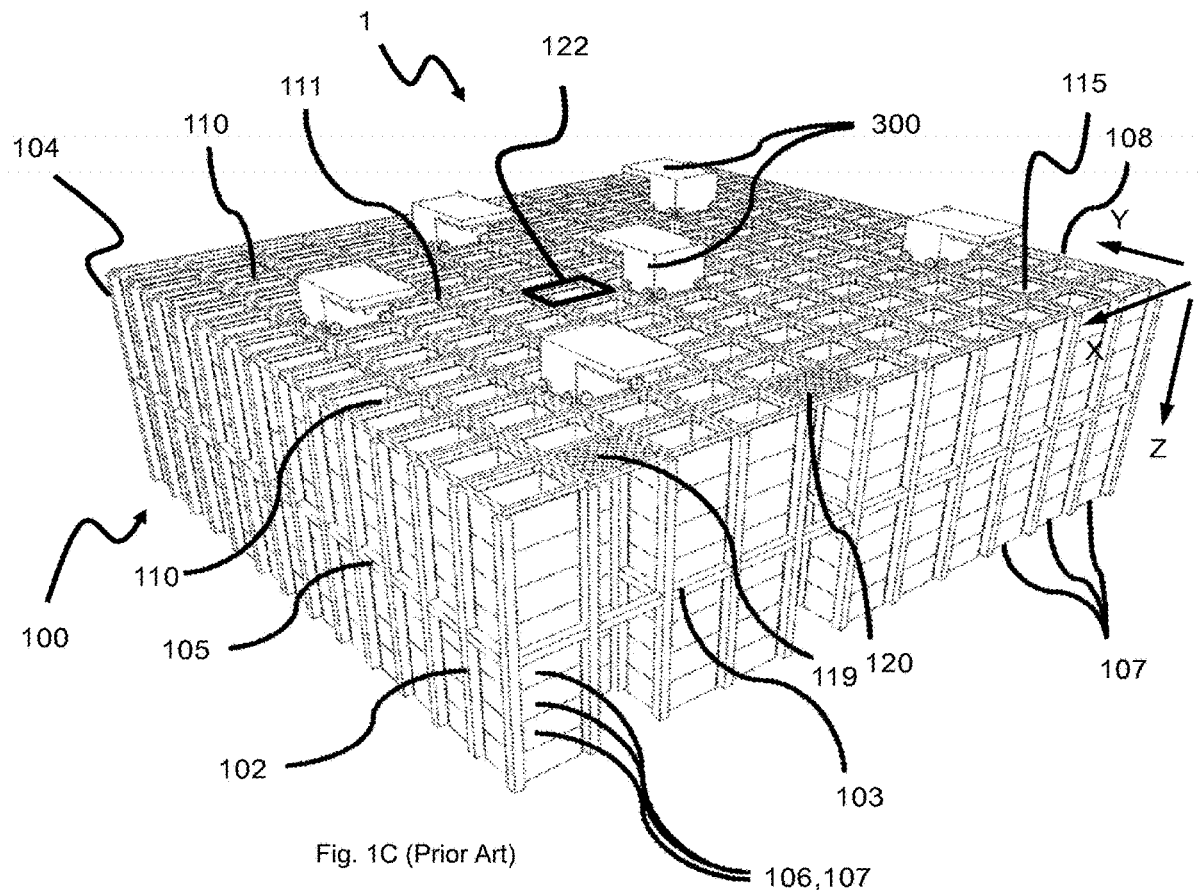
Figure 1D:
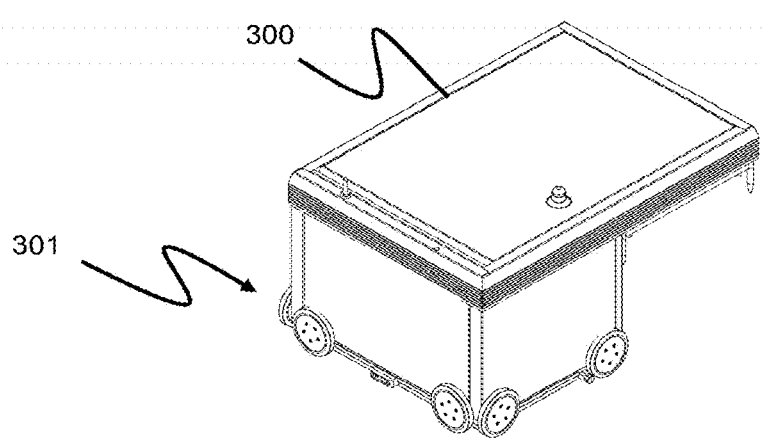

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid cells 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2A:
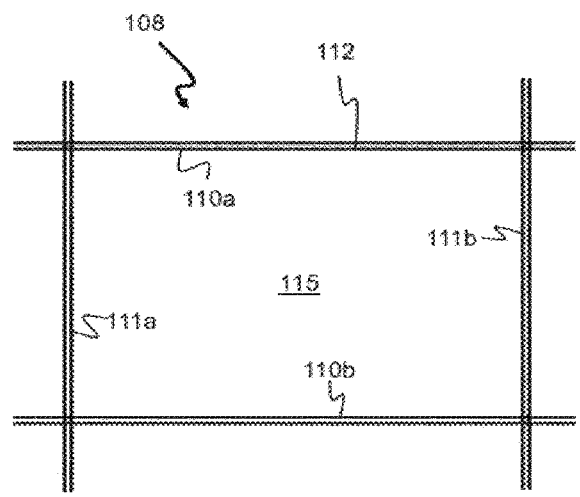
FIG. 2A shows a single-track system.
Figure 2B:
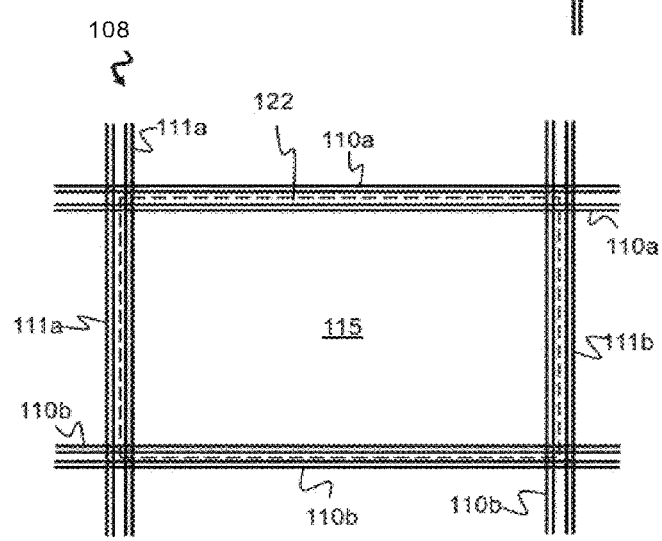
FIG. 2B shows a double track system 2B and FIG. 2 C shows a double track system indicated width and length of a container handling vehicle grid cell.
Figure 2C:
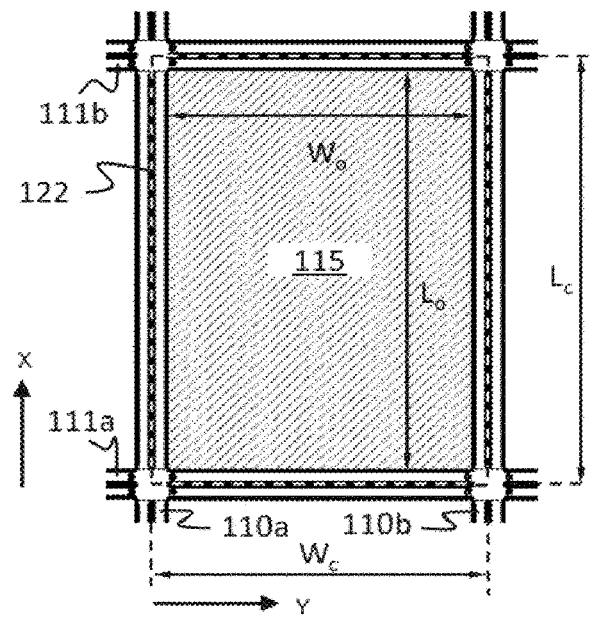
FIG. 2 A-C is a top view of a container handling vehicle rail system, where

The rail system 108 may be a single-track system, as is shown in FIG. 2A. Alternatively, the rail system 108 may be a double track system, as is shown in FIG. 2B. Details of the single and double track system are disclosed this specification under the section of background and prior art.

Figure 3:
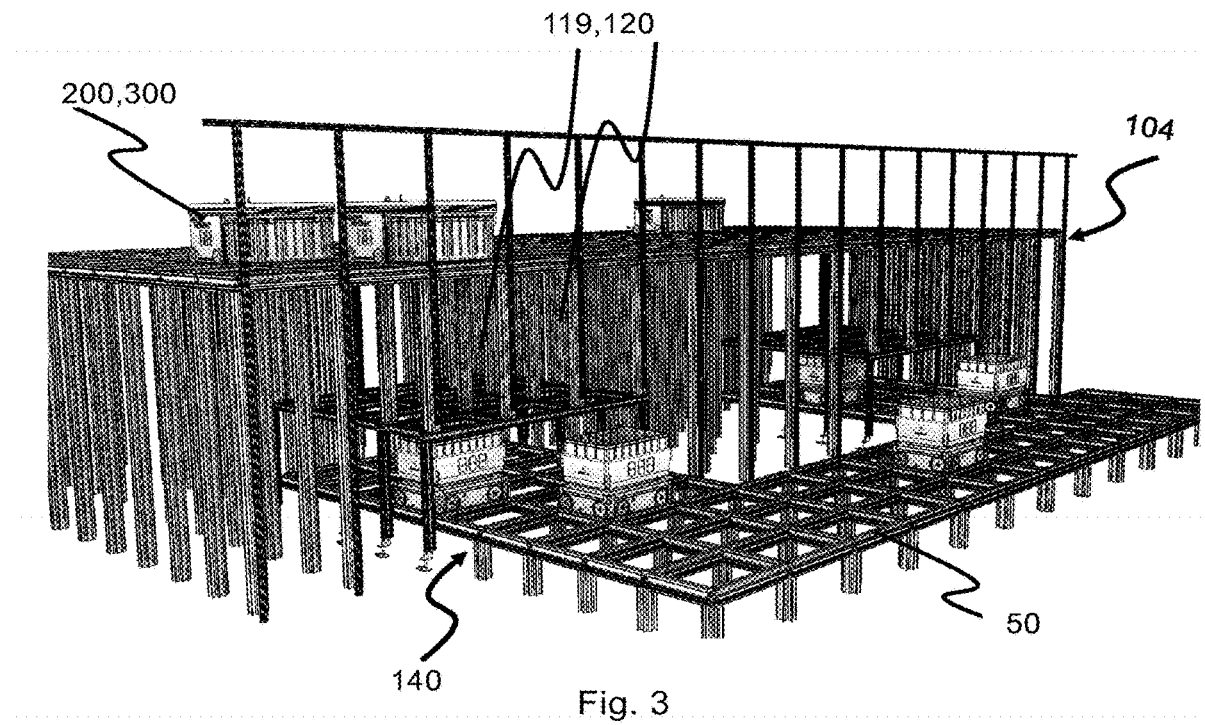
FIG. 3 is a perspective view of an exemplary embodiment of an automated storage and retrieval grid and a delivery system comprising delivery rail system and delivery vehicles.
Figure 4:
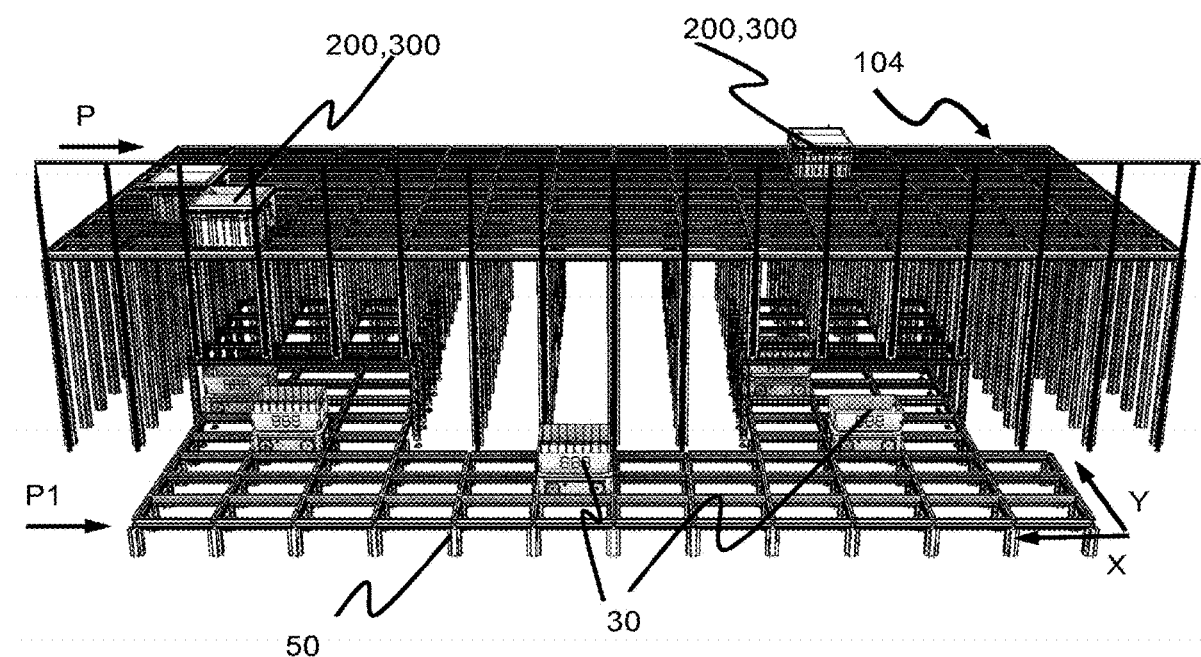
FIG. 4 is another perspective view of an exemplary embodiment of an automated storage and retrieval grid and a delivery system comprising delivery rail system and delivery vehicles.
Figure 5:
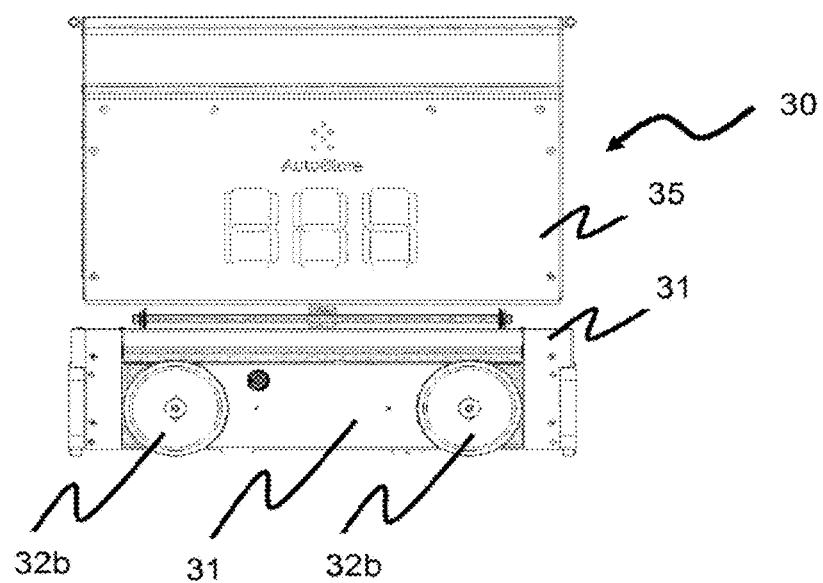
FIG. 5 illustrates a remotely operated delivery comprising a motorized vehicle body and a container carrier for receiving a storage container.
Figure 6:
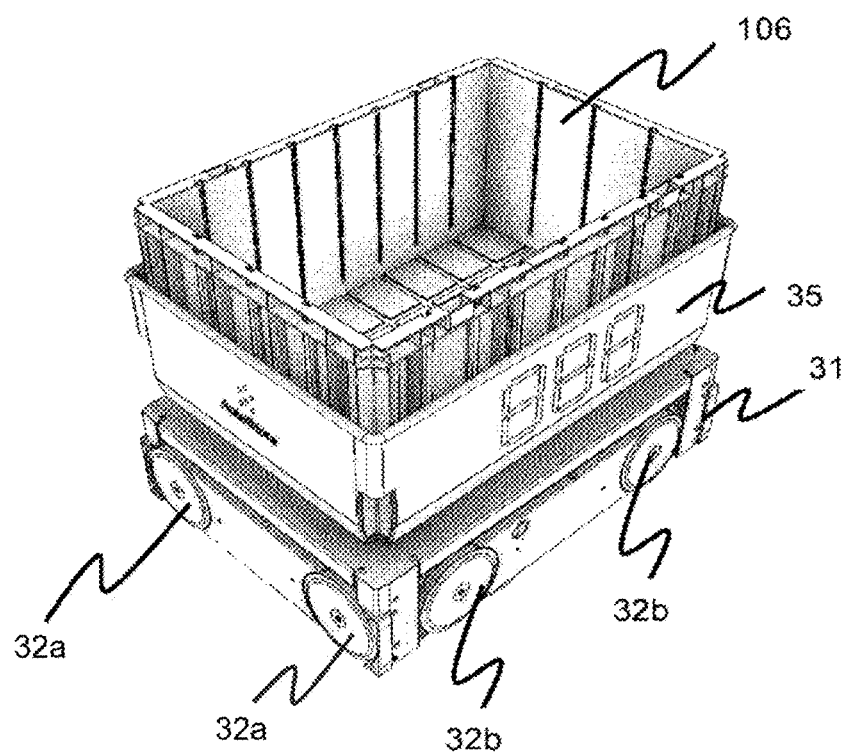
FIG. 6 illustrates another embodiment of the remotely operated delivery vehicle.

Perspective views of an automated storage and retrieval system are shown in FIGS. 3 and 4. The automated storage and retrieval system comprises an automated storage and retrieval grid 104, onto which a plurality of container handling vehicles 200,300 operates, and a delivery system 140 comprising a delivery rail system 50 onto which a plurality of delivery vehicles operates.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 300.

The rail system 108 comprises a first set of parallel trails 110 arranged in a horizontal plane (P) and extending in a first direction (X) and a second set of parallel rails 111 arranged in the horizontal plane (P) and extending in a second direction (Y) which is orthogonal to the first direction (X). The first and second sets of rails 110, 111 form a grid pattern in the horizontal plane (P) comprising a plurality of adjacent grid cells 122. Each grid cell 122 displays a grid opening defined by a pair of neighboring rails of the first set of rails 110 and a pair of neighboring rails of the second set of rails 111.

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

Further, the delivery system 140 comprises one or more of the delivery vehicles 30 as described above, i.e. delivery vehicles 30 configured to receive and support one or more storage containers 106 for transport between one or more delivery columns 119,120 of the storage grid 104 and one or more predetermined positions outside the storage grid 104. The predetermined positions may for example be a second location, a container accessing station, a conveyor line or a transport vehicle such as a truck.

The delivery system 140 may further comprise a delivery rail system 50 situated below a delivery port of the one or more delivery columns 119,120.

Since the plurality of delivery vehicles are operating on the delivery rail system 50 at a level which also human operators are operating, there might be a danger for the delivery vehicles colliding with human operators.

Thus, the present invention is related to a device, system and method of improving the operational safety of a delivery grid system towards human operators.

As shown in FIGS. 3 and 4, the delivery rail system 50 may be constructed in the same way or a similar way as the rail system 108 for the container handling vehicles 200,300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

The delivery rail system 50 may also be a double rail system, as is shown in FIG. 2B, thus allowing a delivery vehicle 30 having a footprint generally corresponding to the lateral area defined by a delivery grid column to travel along a row of grid columns even if another delivery vehicle 30 is positioned above a grid column neighboring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening being delimited by a pair of rails of the first rails and a pair of rails of the second set of rails.

The pair of rails in the X-direction defines parallel rows of delivery grid cells running in the X direction, and the pairs of rails in the Y direction defines parallel rows of delivery grid cells running in the Y direction.

FIGS. 5-8 shows embodiments of a remotely operated delivery vehicle 30 according to the present invention, hereinafter referred to as a delivery vehicle 30.

The delivery vehicle 30 is configured for transport of one or more storage container 106 between an automated storage and retrieval grid 104 configured to store a plurality of stacks 107 of storage containers 106, hereinafter referred to as a storage grid 104, and an access station for handling of the storage container 106 by a human operator. The delivery vehicle 30 may be configured for transport of only one storage container 106 or may be configured for transport of more than on storage containers simultaneously.

Said delivery vehicle 30 comprises; a vehicle body 31, a plurality of wheels 32a, 32b connected to the vehicle body 31, wheel motors for driving the plurality of wheels 32a, 32b in a horizontal plane (P1), and a power source 43 connected to the wheel motors. The power source 43 should provide sufficient power to the wheel motors to propel the plurality of wheels 32 over a set route from the storage grid 104, for example to the container accessing location.

The delivery vehicle 30 further comprises a container carrier 35 mounted above the vehicle body 31. The container carrier 35 is configured to receive the storage container 106 onto or within the container carrier 35 such that the storage container 106 is hindered to move relative to the container carrier 35 in the horizontal direction.

The container carrier 35 may comprise a container supporting device supporting the storage container 106 from below. The form of the container supporting device may be any that ensure stable support, for example in the shape of a cup, a cradle, a seat, a frame, a holder or a platform.

The rolling device 32a, 32b comprises in this exemplary configuration:
- a first set of wheels 32a arranged at opposite portions of a vertical centre plane through the vehicle body 31 for moving delivery vehicle 30 along a first direction, for example along an X-direction on a delivery rail system 50; and
- a second set of wheels 32b arranged at opposite portions of a vertical centre plane through the vehicle body 31 for moving the delivery vehicle 30 along a second direction, for example along a Y-direction on the delivery rail system 50 perpendicular to the first direction X.

Figure 8:
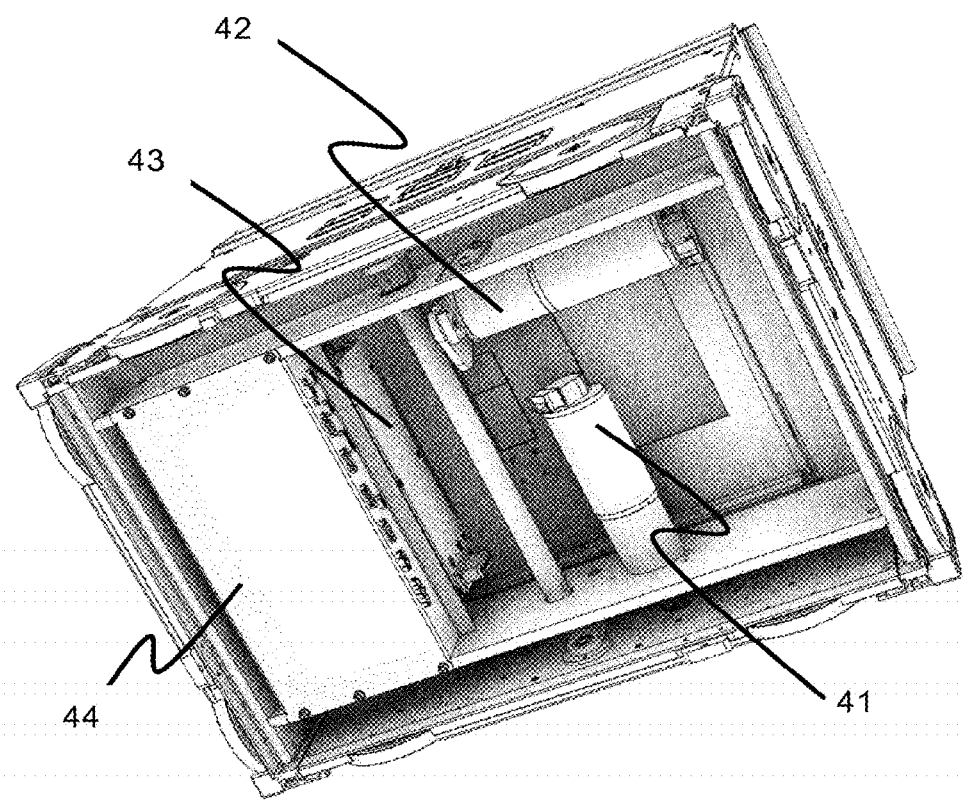
FIG. 8 illustrates an underside of a remotely operated delivery vehicle comprising drive motors, batteries, tilt motors, etc.

As clearly seen in FIG. 8 the vehicle body 31 of the delivery vehicle 30 may comprise an internal component receiving recess or compartment for containing components such as one or more dedicated tilt motors 41, one or more rail shift motors 42, one or more power storage sources such as battery 43 and one or more control units 44 comprising control cards such as CPU and/or Power PCB. The above-mentioned components are thus located within the vehicle body 31, below the container carrier 35.

Figure 7:
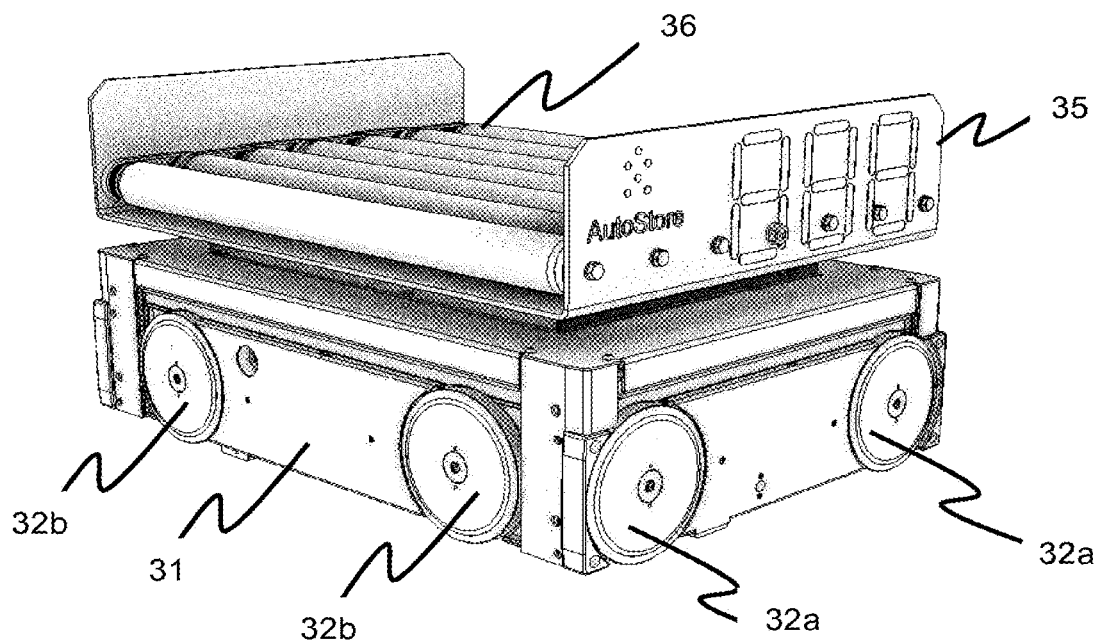
FIG. 7 illustrates a remotely operated delivery vehicle comprising conveyors arranged to receive and transport a storage container.

FIG. 7 shows yet another exemplary configuration of the remotely operated delivery vehicle 30. In this configuration the container carrier 35 may comprise a base plate, a conveyor 36 arranged on the base plate and two parallel side walls protruding upwards from the base plate. The rolling devices 32a, 32b and the vehicle body 31 are equal or similar to the rolling devices 32a, 32b and the vehicle body 31 described above in connection with FIGS. 5-8.

The delivery vehicle 30 comprises a safety device in order to increase the operational safety of a delivery grid system.

Thus, in the event that a collision is detected, the safety device transmits a signal to a control unit 44 such that it performs an action of operating the delivery vehicle 30. The action of operating the remotely operated delivery vehicle 30 is at least any one of; shutting down/off the motor driving the rolling devices 32a,32b, reversing the moving direction of the rolling devices 32a,32b or reducing the speed of the rolling devices 32a,32b.

The collision may be caused by a force (F) acting on the remotely operated delivery vehicle 30 and may be detected by the safety device.

Figure 9:
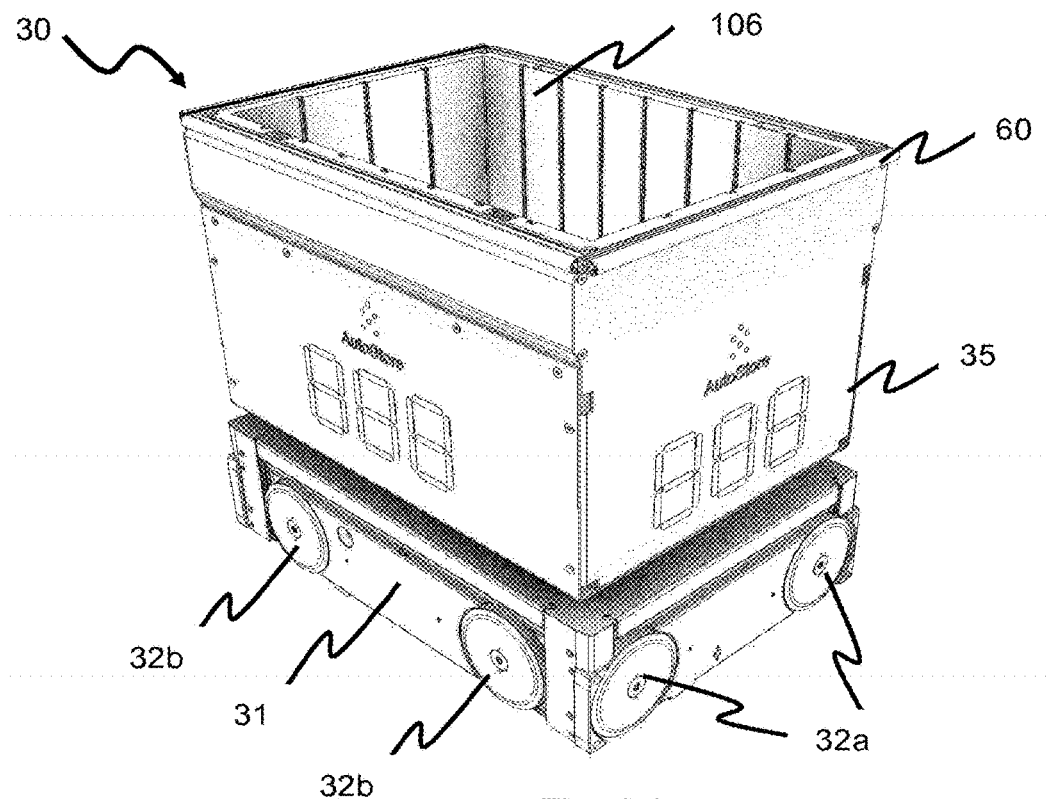
FIG. 9 A-B illustrates a remotely operated delivery vehicle comprising a collision mechanism in form of a pressor sensor arranged as a list at the top of the container carrier.
Figure 9:
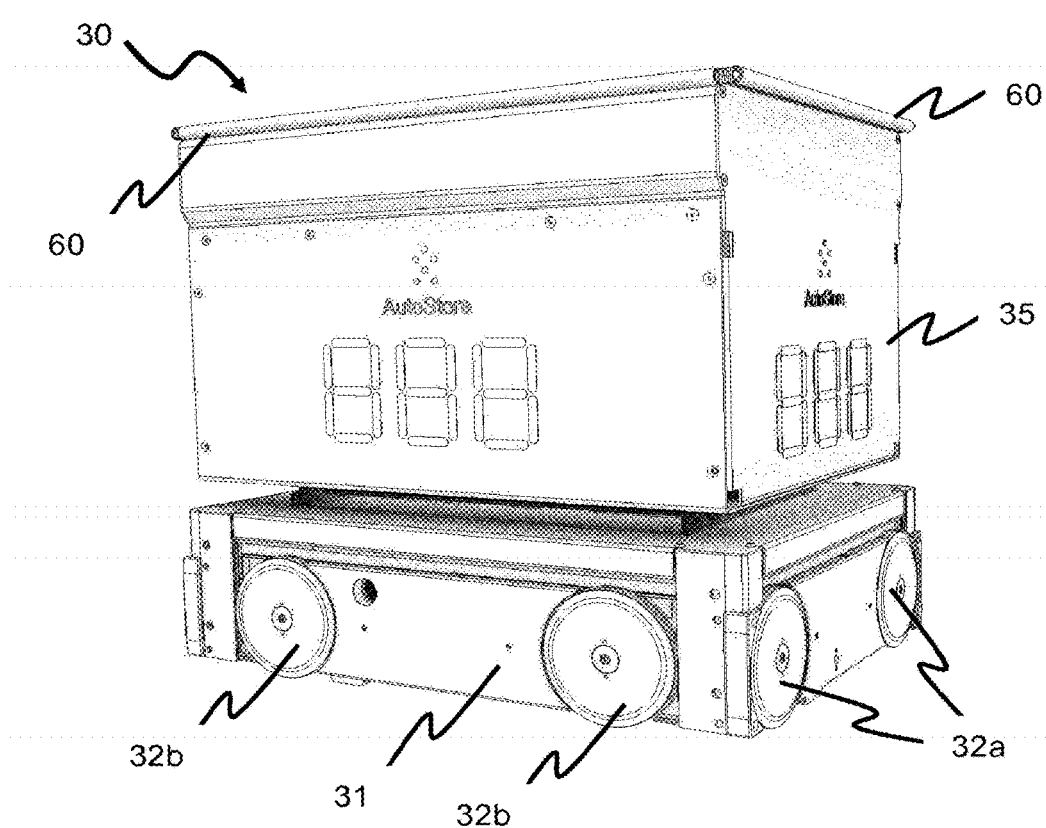

In embodiments, the safety device comprises a collision mechanism 60. The collision mechanism may be a pressure sensor 60 or a clamping strip as shown in FIGS. 9 A and B. The clamping strip may be provided at a periphery of the delivery vehicle 30 or at a location where impact or collision most likely may occur. FIG. 9 A-B shows the clamping strip 60 arranged at the top part of the container carrier 35. In this position the clamping strip 60 may be actuated when a human operator gets his hand, or a body part squeezed.

The clamping strip 60 may comprise two layers of rubber, one with electrically conductive rubber and one with normal insulating rubber. A copper wire molded into two separated layers of electrically conductive rubber forms, together with a resistance at the end of the clamping strip, a closed circuit.

In the event of a collision, the two separated layers of conductive rubber are pressed together, causing the device to short-circuit. Thus, the collision is detected and triggers the safety device to transmit the operation signal to the control unit of the delivery vehicle 30.

The clamping strip 60 may be mounted such that it protrudes from the side walls of the container carrier 35 and arranged such that in case of an external force (F) acting on the container carrier 35, the pressure sensor/clamping strip 60 may be the first area of impact.

The safety device may comprise a sensor/switch 65 and a collision mechanism 60 which is in the form of a moveable arm 60 provided at a side of the container carrier 35 and extending to an underside of the container carrier 35. The arm is connected to the underside of the container carrier 35 and moveable along a track 63 between a first position in which the delivery vehicle 30 is operating, and a second position in which the safety device is tripped. The displaceable arm 60 is connected to the sensor/switch and configured to trip the safety device in the event that displaceable arm 60 is moved towards the container carrier 35.

Figure 10:
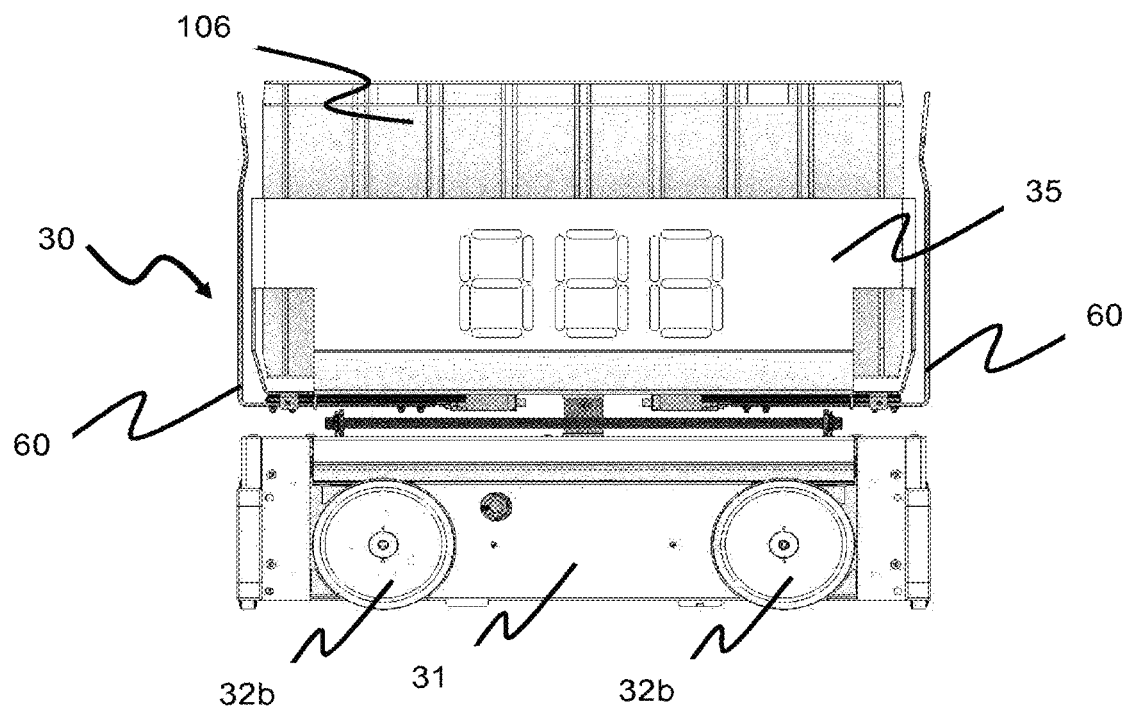
FIG. 10 A-C illustrates a remotely operated delivery vehicle comprising a collision mechanism in form of a sliding device connected to the container carrier.
Figure 10:
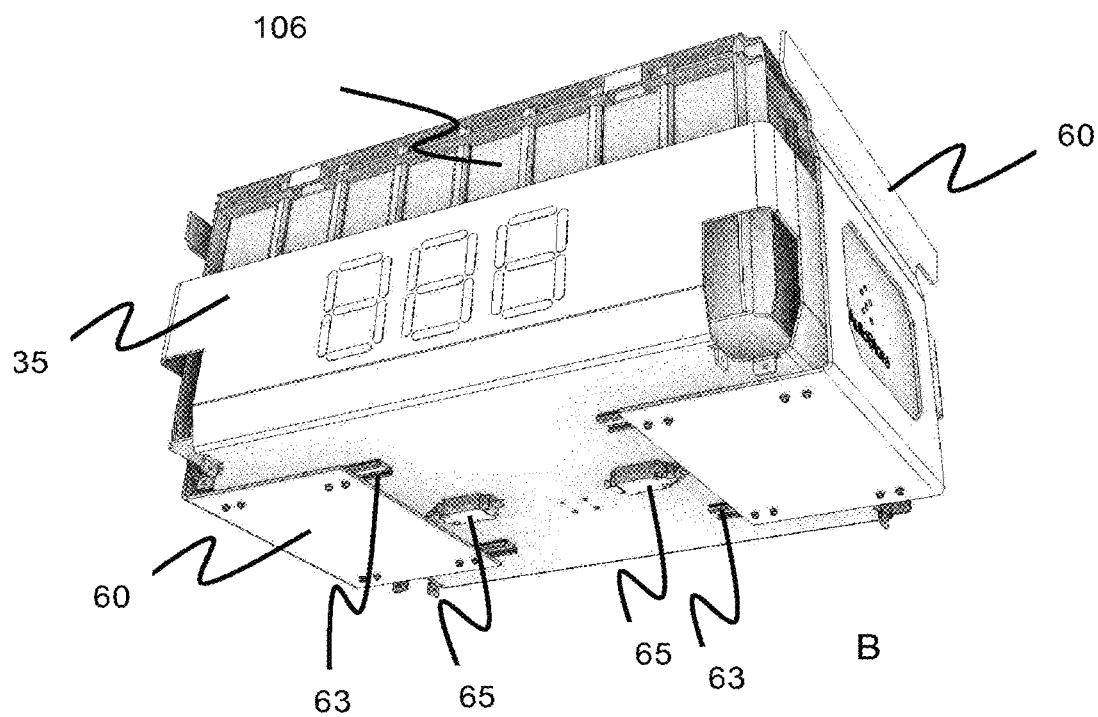

FIGS. 10 A and B shows the arm 60 in the form of an L-shaped plate extending from a bottom part of the container carrier 35 to an upper end of the container carrier 35. The L-shaped plate may be connected to the container carrier 35 by means of a track system provided at the bottom part (of the bottom plate) of the container carrier 35 allowing the L-shaped plate to be displaced in a plane substantially parallel to the bottom plate of the container carrier 35. The L-shaped plate 60 is connected to the sensor/switch 65 which will trip the safety device upon impact or collision. In operation, the L-shaped plate will be in a first position and the rolling device motor is driving the wheels 332*a*, 32*b* in a first vehicle moving direction, upon impact or collision the L-shaped plate is pushed (displaced) to a second position in which the sensor/switch 65 is activated and trips the safety device, transmitting a signal to the control unit such that it performs the operational action to the delivery vehicle. This operational action causes the delivery vehicle 30 to stop or reverse.

The collision mechanism 60 may also be a container carrier displacement device 60, which displacement device 60 is displaceable relative to a centered reference position. Thus, a first state of the container carrier displacement device 60 may be a centered reference position, wherein the second state may be any position of the container carrier displacement device 60 displaced relative to the centered reference position.

In the centered reference position (first state) of the container carrier displacement device 60; the rolling device motor is running the rolling device (such as wheels or belts) and the delivery vehicle 30 is moving on the delivery rail system 50. In case of an impact or collision, the container carrier displacement device 60 will automatically move to the second state, tripping the safety device such that the rolling devices are put in reverse. Thus, the container carrier displacement device 60 can move forwards or backwards relative to the centered reference position, such that the delivery vehicle will reverse the first vehicle moving direction, when the container carrier displacement device is displaced in any of said directions relative to the centered reference position.

Figure 11:
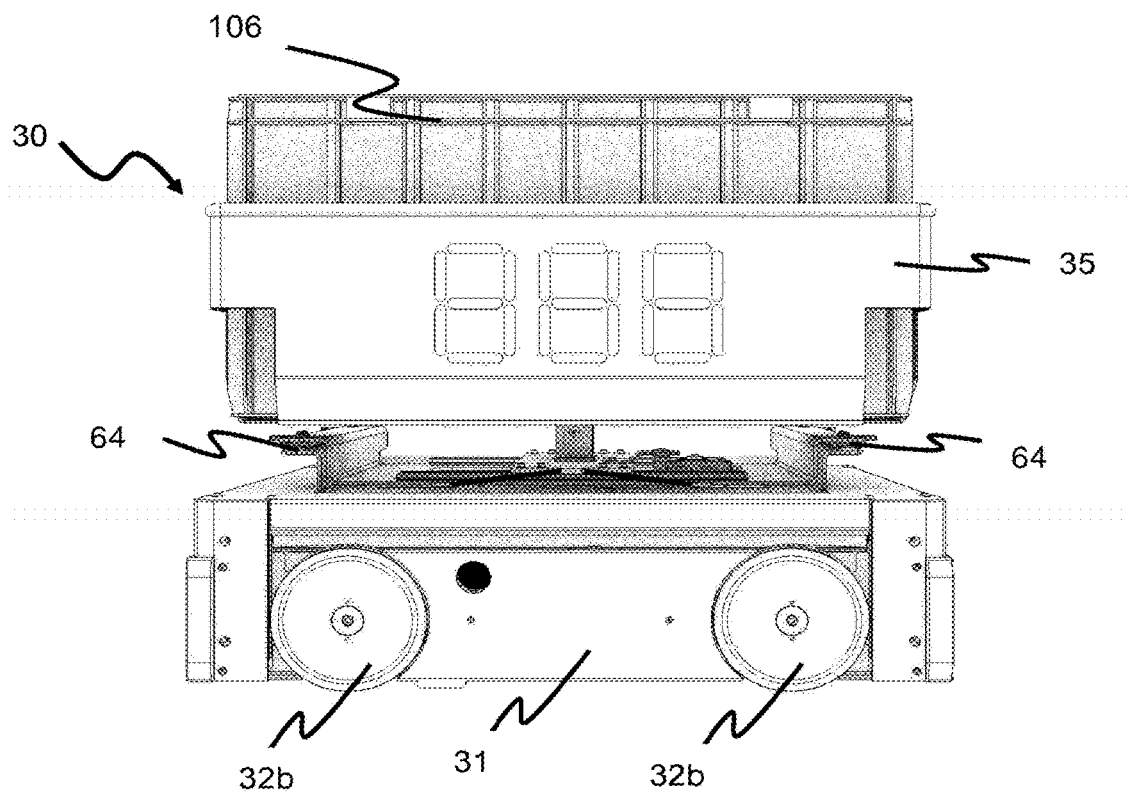
FIG. 11 A-B illustrates a remotely operated delivery vehicle comprising a collision mechanism in form of a container carrier displacement device.
Figure 11:
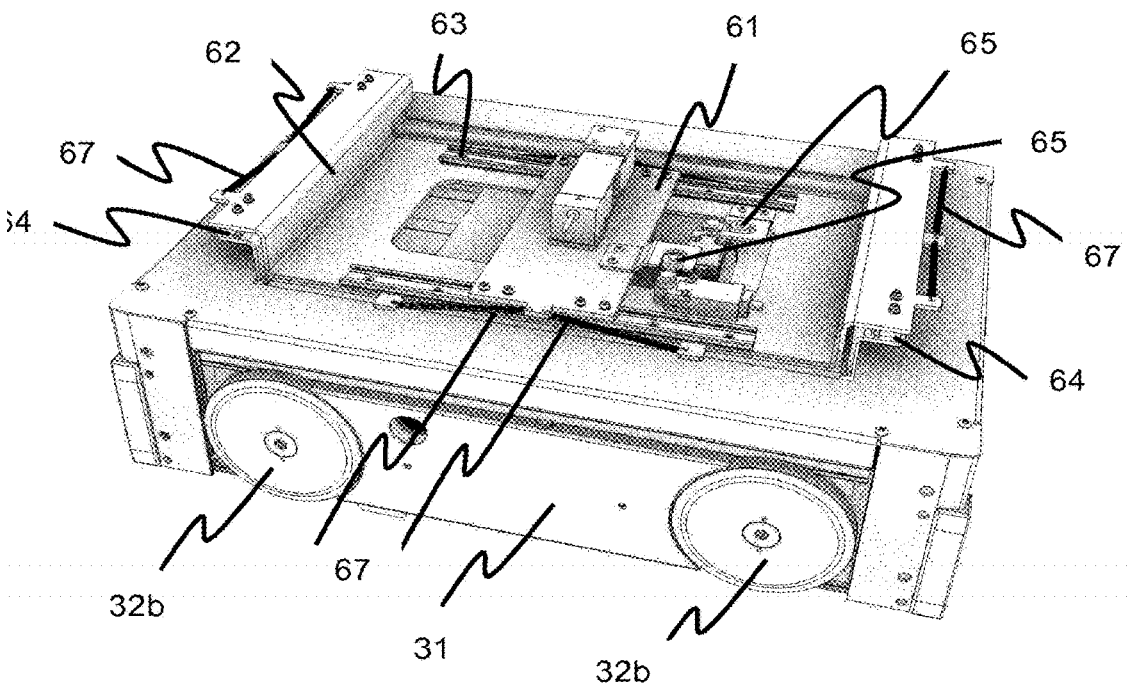

FIGS. 11 A and B shows that the container carrier displacement device 60 may be centered in the reference position by means of springs 67. The container carrier displacement device may also be connected to a sensor/switch 65 which is adapted to trip the safety device when activated.

The sensor/switch 65 may be arranged protruding through an opening provided on the container carrier displacement device 60. The lever and the container carrier displacement device cooperate such that when the container carrier displacement device 60 is moved in a direction forward or backward (relative to the centered reference position), the lever moves simultaneously such that the safety device is tripped.

Figure 12:
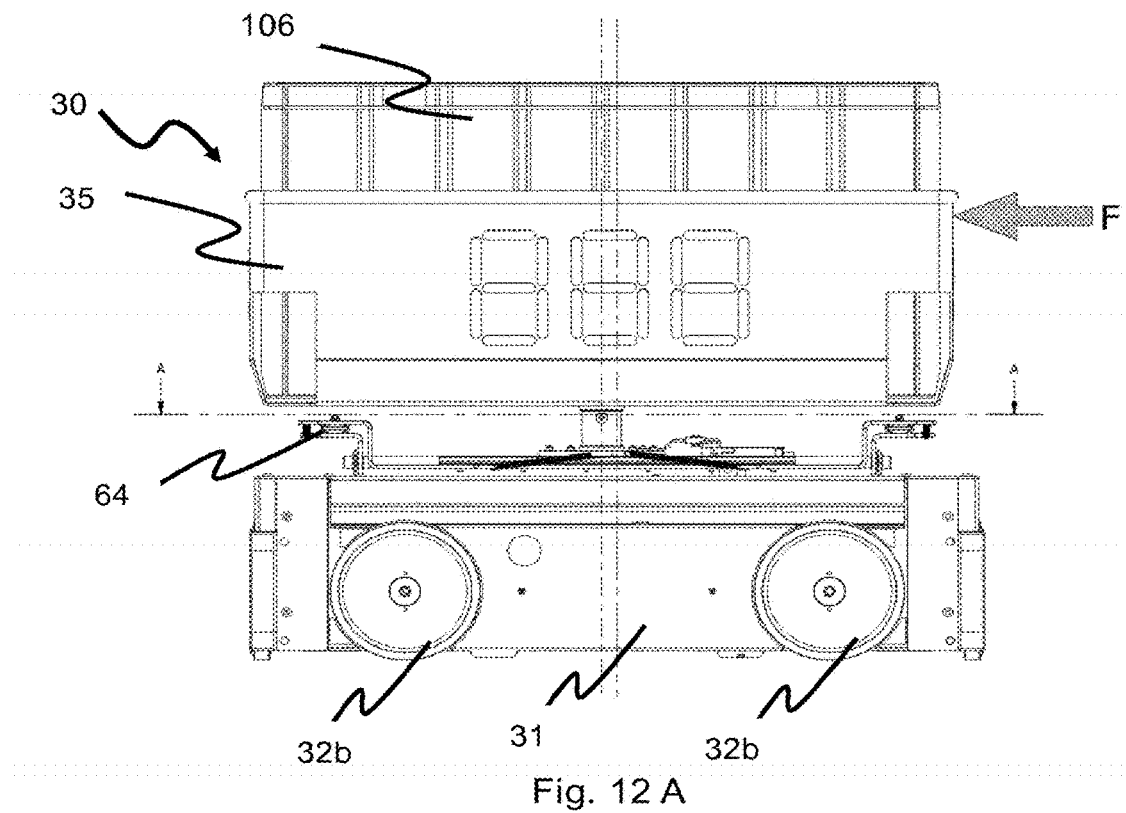
FIG. 12 A-B illustrates a remotely operated delivery vehicle comprising a collision mechanism in form of a container carrier displacement device arranged such that it activates upon displacement of the container carrier relative to the motorized vehicle body in the X direction.
Figure 12:
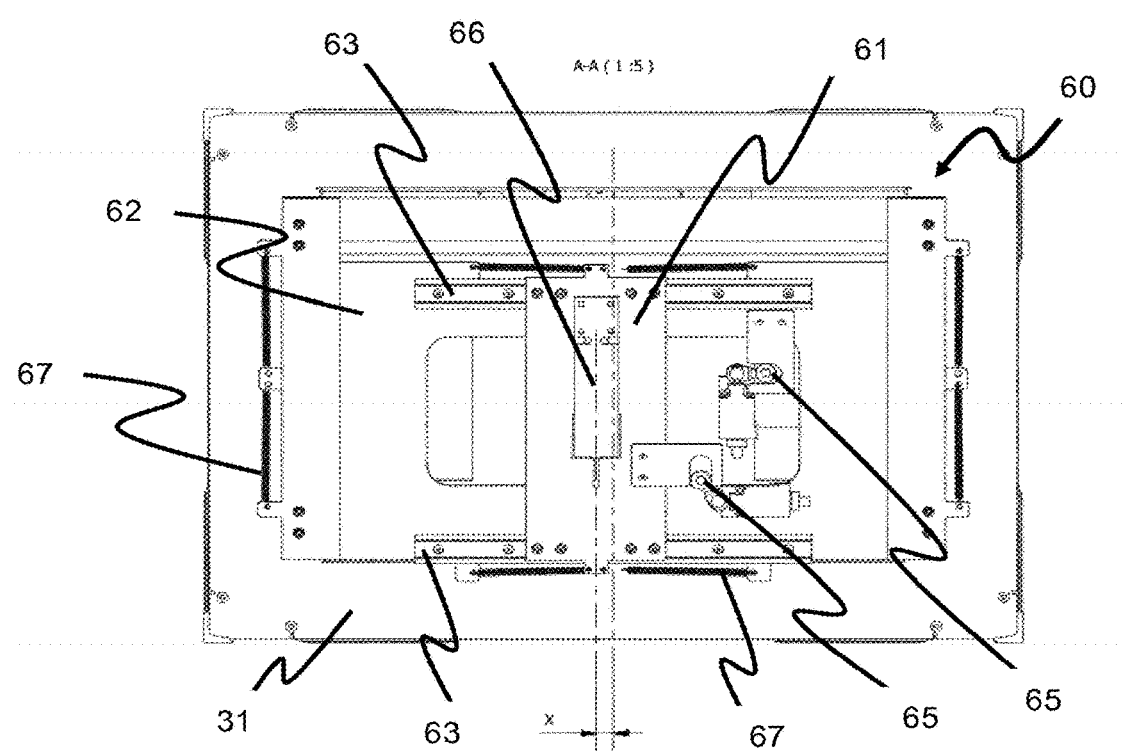

FIGS. 12 A-B and 13 A-B shows that the container carrier displacement device 60 can be displaced in both X and Y direction (first and second direction). The container carrier displacement device 60 comprises a first plate 61 having a first and a second state in a first direction (X), and a second plate having a first and the second state in a second direction (Y) which is orthogonal to the first direction. Thus, the first plate 61 and the second plate 62 is moveable between a first and second position, each position comprising respectively the first state and the second state.

Hence, the delivery vehicle may be stopped upon impact or collision in a first direction (X) or in a second direction (Y), when the first plate 61 or the second plate 62 is being displaced respectively.

The first plate 61 may be arranged on a first track 63. The first track 63 may be arranged such that it allows the movement of the first plate 61 in the first direction (X). The second plate 62 may be arranged on a second track 64. The second track 64 is arranged such that it allows the movement of the second plate 62 in the second direction (Y). The first and second tracks 61,62 may at least any one of a; rail, track slot, etc., allowing sliding movement of said tracks 61,62 relative to the delivery vehicle 30.

FIGS. 12 A and B shows the container carrier displacement device 60 in the first direction (X). The first plate 61 is arranged on a first track 63 provided on the second plate 62. The container carrier 35 is connected to the first plate 61, wherein the first plate 61 may be centered in the first position by means of springs 64. When a force (F) acting on the container carrier 35, the first plate 61 is moved from the first to a second position displaced relative to the first position. FIG. 9 B shows the first plate 61 displaced from a centered first position. Wherein in the second position, the sensor/switch 65 is activated, tripping the safety device such that the control unit is instructed to stop the motor, or reverse the moving direction of the vehicle 30 and consequently, the wheels 32*b* in the first direction (X) are set in reverse, or setting on the brakes for the wheels 32*b* for slowing down the delivery vehicle 30.

Figure 13:
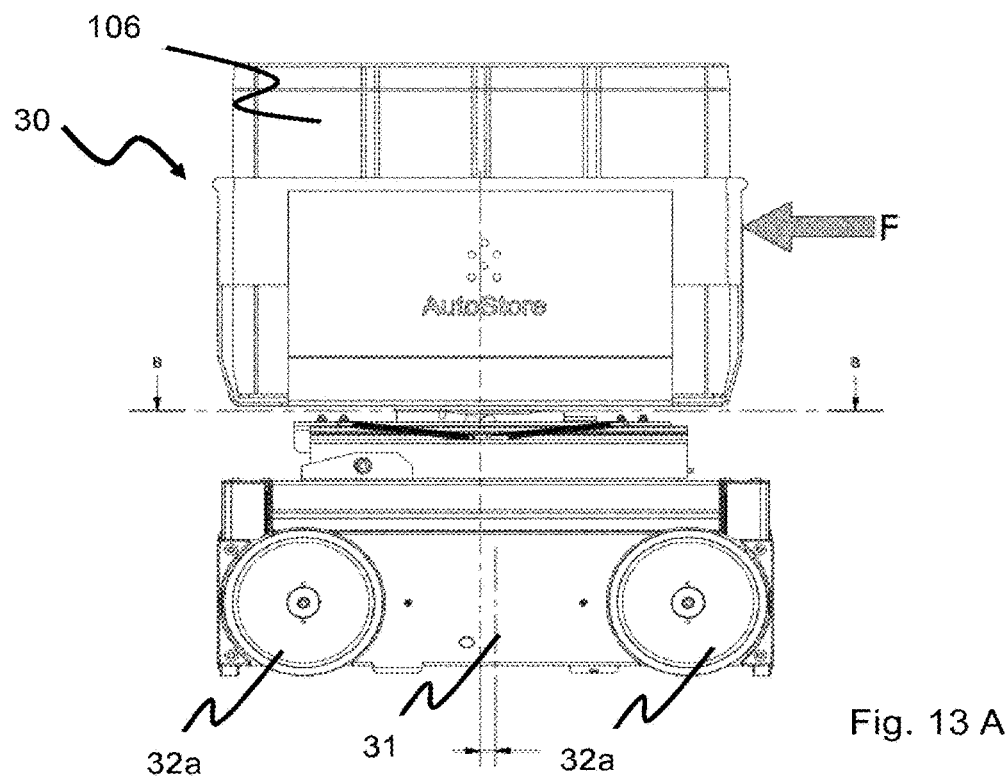
FIG. 13 A-B illustrates a remotely operated delivery vehicle comprising a collision mechanism in form of a container carrier displacement device arranged such that it activates upon displacement of the container carrier relative to the motorized vehicle body in the Y direction.
Figure 13:
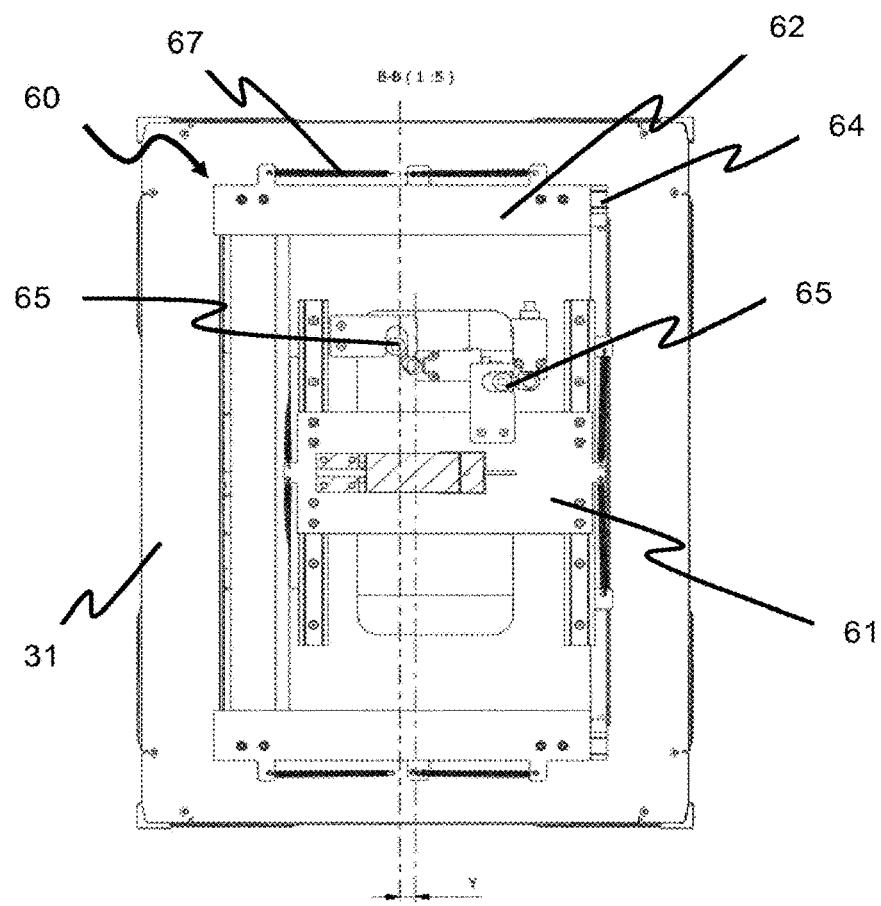

FIGS. 13 A and B shows the container carrier displacement device 60 in the second direction (Y). The second plate 62 is arranged on a second track 64 provided on the vehicle body 31 of the delivery vehicle 30, for movement of the second plate 62 in the second direction (Y). The second plate 62 may be centered in the first position (first state) by means of springs 67. When a force (F) acting on the container carrier 35 in the second direction (Y), the second plate 62 is moved to a second position displaced relative to the first position. FIG. 10 B shows the second plate 62 displaced from a centered first position. Wherein in the second position (second state), the sensor/switch 65 activates, tripping the safety device such that the control unit is instructed to stop the vehicle motor, or reverse the moving direction of the vehicle 30 and consequently, the wheels 32*a* in the second direction (Y) are set in reverse, or setting on the brakes for the wheels 32*a* for slowing down the delivery vehicle 30.

REFERENCE NUMERALS

30 Delivery vehicle
31 Vehicle body
32 Rolling device
32a First set of wheels
32b Second set of wheels
35 Container carrier
41 Tilt motor
42 Rail shift motor
43 Power source
44 Control unit
50 Delivery rail system
51 First set of parallel rails
52 Second of parallel rails
60 Collision mechanism/container carrier displacement device
61 First plate
62 Second plate
63 First track
64 Second track
65 Sensor/Switch
67 Spring
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
200 First container handling vehicle
300 Second container handling vehicle
X First direction
Y Second direction
P Horizontal plane of rail system

The invention claimed is:

1. A remotely operated delivery vehicle for transport of a storage container between an automated storage and retrieval grid, which is configured to store a plurality of stacks of storage containers, and an access station for handling of the storage container by at least one of a robotic operator and human operator, the remotely operated delivery vehicle comprising:
a vehicle body comprising a motor for driving a plurality of rolling devices for moving the remotely operated delivery vehicle in a horizontal plane;
a control unit for controlling the remotely operated delivery vehicle; and
a container carrier displaceably mounted to the motorized vehicle body, wherein the container carrier is configured to receive a storage container within the container carrier;
wherein the remotely operated delivery vehicle comprises a safety device which transmits a signal to the control unit such that it performs an action of operating the remotely operated delivery vehicle, in an event that a collision is detected,
wherein the collision is caused by a force acting on the container carrier of the remotely operated delivery vehicle and is detected by a collision mechanism of the safety device, and
wherein the collision mechanism is a container carrier displacement device arranged such that it trips the safety device upon sensing displacement of the container carrier, relative to the motorized vehicle body, from an undisplaced position relative to the motorized vehicle body to a displaced position relative to the motorized vehicle body.

2. The remotely operated delivery vehicle according to claim 1, wherein the action of operating the remotely operated delivery vehicle is at least one of shutting off the motor, reversing a moving direction of the rolling devices, or reducing a speed of the rolling devices.

3. The remotely operated delivery vehicle according to claim 1, wherein the collision mechanism is a pressure sensor.

4. The remotely operated delivery vehicle according to claim 1, wherein the collision mechanism is a sliding device connected to the container carrier which sliding device trips the safety device when sliding from a first position to a second position.

5. The remotely operated delivery vehicle according to claim 1, wherein the container carrier displacement device comprises a first sliding part moveable in a first direction, and a second sliding part moveable in a second direction which is orthogonal to the first direction.

6. The remotely operated delivery vehicle according to claim 5, wherein the second sliding part is arranged on a second track provided on the motorized vehicle body for movement in the second direction, and a first plate is arranged on a first track provided on the second sliding part, for movement in the first direction.

7. An automated storage and retrieval system comprising an automated storage and retrieval grid for storage of storage containers, and a delivery system for transport of said storage containers between the automated storage and retrieval grid and a container accessing station of the delivery system,
wherein the automated storage and retrieval grid comprises a container handling vehicle rail system for guiding a plurality of container handling vehicles, the container handling vehicle rail system comprising at least a first set of parallel rails arranged in a horizontal plane and extending in a first direction, and at least a second set of parallel rails arranged in the horizontal plane and extending in a second direction which is orthogonal to the first direction, which first and second sets of rails form a grid pattern in the horizontal plane comprising a plurality of adjacent container handling vehicle grid cells,
wherein the delivery system comprises a delivery rail system for guiding a plurality of remotely operated delivery vehicles, the delivery rail system being arranged on a level below the container handling vehicle rail system and extends to the container accessing station,
wherein the remotely operated delivery vehicle comprises:
a vehicle body comprising a motor for driving a plurality of rolling devices for moving the remotely operated delivery vehicle in a horizontal plane;
a control unit for controlling the remotely operated delivery vehicle; and a container carrier displaceably mounted to the motorized vehicle body, wherein the container carrier is configured to receive a storage container within the container carrier, wherein the remotely operated delivery vehicle comprises a safety device which transmits a signal to the control unit such that it performs an action of operating the remotely operated delivery vehicle, in an event that a collision is detected, wherein the collision is caused by a force acting on the container carrier of the remotely operated delivery vehicle and is detected by a collision mechanism of the safety device, and wherein the collision mechanism is a container carrier displacement device arranged such that it trips the safety device upon sensing displacement of the container carrier, relative to the motorized vehicle body, from an undisplaced position relative to the motorized vehicle body to a displaced position relative to the motorized vehicle body.

8. The automated storage and retrieval system according to claim 7, wherein the action of operating the remotely operated delivery vehicle is at least one of shutting down the motor, reversing a moving direction of the rolling devices or reducing a speed of the rolling devices.

9. The automated storage and retrieval system according to claim 7, wherein the delivery system further comprises a delivery rail system the delivery rail system comprises at least a first set of parallel rails arranged in the horizontal plane and extending in a first direction, and at least a second set of parallel rails arranged in the horizontal plane and extending in a second direction which is orthogonal to the first direction, which first and second sets of rails form a grid pattern in the horizontal plane comprising a plurality of adjacent delivery vehicle grid cells.

10. Method of improving operational safety of a delivery grid system, wherein the delivery system comprises a remotely operated delivery vehicle comprising:
- a vehicle body comprising a motor for driving a plurality of rolling devices for moving the remotely operated delivery vehicle in a horizontal plane;
- a control unit for controlling the remotely operated delivery vehicle;
- a container carrier displaceably mounted to the motorized vehicle body wherein the container carrier is configured to receive a storage container within the container carrier, and
- a safety device which activates in an event that a collision is detected, wherein the method comprises:
- a) operating the remotely operated delivery vehicle on the delivery grid system,
- b) detecting a collision, which is caused by a force acting on the container carrier of the remotely operated delivery vehicle, by means of a collision mechanism of the safety device, wherein the collision mechanism is a container carrier displacement device arranged such that it trips the safety device upon sensing displacement of the container carrier, relative to the motorized vehicle body, from an undisplaced position relative to the motorized vehicle body to a displaced position relative to the motorized vehicle body,
- c) activating a safety device to transmit a signal to the control unit,
- d) performing an action of operating the remotely operated delivery vehicle, said action being at least one of shutting down the motor, reversing a moving direction of the rolling devices or reducing a speed of the rolling devices.

\* \* \* \* \*